United States Patent [19]
Martin et al.

[11] 3,834,687
[45] Sept. 10, 1974

[54] WORKPIECE SUPPORT

[75] Inventors: James A. Martin, Oak Ridge, Tenn.;
W. Reneau Dubberley, Decatur, Ga.

[73] Assignee: The United States of America as represented by the United States Atomic Energy Commission, Washington, D.C.

[22] Filed: Jan. 16, 1973

[21] Appl. No.: 324,016

[52] U.S. Cl. .................................... 269/7, 269/13
[51] Int. Cl. .............................................. B23g 3/00
[58] Field of Search .............. 51/277; 264/261, 262; 269/7, 13

[56] References Cited
UNITED STATES PATENTS

| | | | |
|---|---|---|---|
| 3,268,632 | 8/1966 | Eves | 264/261 X |
| 3,353,307 | 11/1967 | Sarofeen | 51/277 X |
| 3,355,342 | 11/1967 | Lanman | 51/277 X |
| 3,471,178 | 10/1969 | Roe | 264/261 X |

Primary Examiner—Roy Lake
Assistant Examiner—Mark S. Bicks
Attorney, Agent, or Firm—John A. Horan; David S. Zachry; Earl Larcher

[57] ABSTRACT

This invention pertains to a method and fixture for supporting a workpiece in a machine tool for machining purposes. The fixture comprises a machine-chuck receiving base with a projection thereon or cavity therein of a configuration generally conforming to at least a portion of an internal or external surface of the workpiece. The workpiece is positioned in a contiguous nesting relationship with the projection or cavity and a workpiece retaining liner is disposed between the internal or external surface of the workpiece and the base. The liner is formed in place and consists of a low-shrinkage elastomeric material that has been cured in place at approximately room temperature.

2 Claims, 1 Drawing Figure

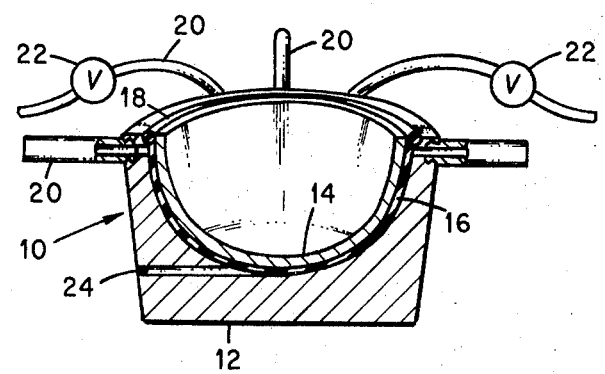

WORKPIECE SUPPORT

The present invention relates generally to a fixture for holding a workpiece in a machine tool for machining purposes, and more particularly to such a fixture and method of providing the same wherein the workpiece is supported in a stress-free state. This invention was made in the course of, or under, a contract with the U.S. Atomic Energy Commission.

In the manufacture of hollow parts defined by a surface of revolution such as in cones, hemispheres, cylinders and the like, the machining of the interior surfaces is provided by supporting the part or workpiece in a suitable chuck mechanism of a machine tool in a metal working relationship to the metal working tool. The fixtures previously employed for supporting the workpiece in the machine chucks have not been particularly suitable, especially for workpieces which are relatively easily distorted due to wall thickness, flexibility, or configuration. Multiple-jawed chucks force the workpiece to take the configuration dictated by the chuck configuration and its adjustment. Even vacuum-chuck assemblies, including those which expose the entire confined surface to vacuum, have caused some problems since the configuration of such assemblies does not exactly correspond to the configuration of the workpiece and can not provide complete contact between the workpiece and the chuck assemblies; the vacuum load (up to 14.7 psi) distorts the workpiece until its surface makes contact with the surface of the chuck or until the spring rate of the workpiece equilibrates with the vacuum loading. Thus, when workpieces were machined the machine tool loading at the unsupported points on the machining surface forced the workpiece to conform, at least in part, to the configuration of the holding fixture. With the workpiece being so distorted and frequently constrained in this distorted configuration by the fixture the workpiece is machined in a distorted shape. After release from the fixture the workpiece or machined part reverts or "springs" back into its unrestrained configuration with this change of shape resulting in an error that appeared to be caused by faulty machining. Further, the use of fullcontour vacuum chucks requires that the surface portion of the workpiece confined in and contacted by the vacuum chuck be machined to insure adequate contact with the chuck.

Efforts to hold the workpiece in a nondistorted or free state for machining operations also included the placement of a liner between the support fixtures and the workpiece with the latter being held in place during the machining operation by adhesion with the liner or by vacuum penetrating the liner. These liners were previously formed of waxes, low-melting metals, porous metal sponges, ceramic potting compounds, and plastics. Except for the metal sponges, the liners were usually cast in place against a particular surface of the workpiece. However, liners of such materials did not prove to be satisfactory for one or more of the following reasons: the excessive temperatures required for melting or curing the liner frequently caused thermal damage to the part; the shrinkage or expansion of the liner during the formation thereof excessively stressed or distorted the workpiece; the abrasiveness of the liner material marked or otherwise damaged surface finishes of machined parts; and the tenacious adherence of the liner material to the fixture or part required part-damaging force for separation. For example, waxes, such as paraffin, while possessing low-melting temperatures, were unsuitable because they required heating of the workpiece, the wax, and the chuck assembly to the melting temperature of the wax. Also, the high shrinkage of the wax during solidification imparted stresses to the workpiece.

Accordingly, it is the primary aim or objective of the present invention to provide an improved method and fixture for supporting workpieces of the aforementioned configuration in a working relationship to a machine tool. The improved method for supporting the workpiece comprises preparing a workpiece-supporting fixture by the steps of providing a base of the fixture securable to said machine with a surface portion of a configuration substantially corresponding to an internal or external surface of said workpiece, placing corresponding surfaces of said workpiece and said surface portion in a nesting relationship, disposing between contiguous surfaces of said portion and said workpiece an elastomeric material curable at a temperature in the range of about 20°–40°C. with said elastomeric material contacting virtually the entire internal or external surface of workpiece oppositely disposed from the entire surface of the workpiece upon which said work is to be applied, and curing the elastomeric material to form a liner for separating said workpiece from said portion and for securing the workpiece to the latter in a stressfree state.

Other and further objects of the invention will be obvious upon an understanding of the illustrative embodiment and method about to be described, or will be indicated in the appended claims, and various advantages not referred to herein will occur to one skilled in the art upon employment of the invention in practice.

In the accompanying drawing:

The FIGURE is a schematic sectional view of the workpiece-holding fixture of the present invention illustrating the fixture with the workpiece disposed therein and retained by the elastomeric liner.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. The embodiment of the fixutre illustrated is shown with the liner adhering to the external surface of the workpiece to provide for the machining of the internal surface of the workpiece. However, it is to be understood that a fixture prepared in accordance with the teachings of the present invention can by positioning the liner and a portion of the base within the workpiece support the workpiece to provide for the machining of the external surfaces of the latter.

The present invention is for use in the metallic and non-metallic machining technology and is directed to a fixture for supporting hollow workpieces of the aforementioned configurations in a rotatable and/or stationary machine chuck, table, or spindle in a working relationship to an appropriate machine tool. As shown in the drawing the fixture 10 comprises a base 12 of metal, ceramic, plastic, or combinations of same, adapted to be secured in or to the machine (not shown)

in any suitable manner, e.g., vacuum, bolts, or movable jaws, with the base being configured to receive the workpiece 14 in a nesting relationship for supporting the latter. The workpiece 14 is, in turn, secured to the base by an elastomeric liner 16 that is disposed between the base 12 and the workpiece 14 with the liner 16 in contact with virtually the entire surface area of the workpiece 14 oppositely disposed from the surface area thereof to be machined.

The liner 16 is formed in place by extruding a suitable elastomeric material between the workpiece and the base with the liner separating and sufficiently adhering to the latter and to the workpiece to maintain the workpiece in the fixture during the machining operation. The space between the base and the workpiece will not be uniform due to out-of-roundness of both the workpiece, which may be in a rough or semi-machined state, and the base so as to cause irregular flow of the extruded elastomer. A vacuum assist is employed to facilitate the extrusion of the selected elastomeric formulation without creating stresses in the workpiece which would not decay before the elastomer cures. To provide the vacuum-assisted extrusion an adequate quantity of the catalyzed elastomeric formulation to form the liner is poured into the bottom of the workpiece-receiving receptacle, i.e., the base 12. The workpiece 14 is then placed in the receptacle and lightly urged by any suitable means against the elastomeric formulation to initiate the extrusion of the latter from the polar to the equatorial regions of the workpiece. A seal such as an O-ring of surgical rubber or the like, as shown at 18, is positioned about the workpiece at the equator, i.e., near the top or open end thereof, to seal the space between the base and the workpiece so that the space can be evacuated to "sink" the workpiece into the base and simultaneously draw the elastomeric formulation upward to the equator, against the O-ring. Irregular flow of the elastomeric formulation during the extrusion thereof is obviated or substantially minimized by positioning a suitable number of removable, circumferentially spaced apart vacuum lines 20 about the base near the equator or top of the workpiece with each line having a separate flow control valve 22 and in registry with the space between the base and the workpiece. Eight flexible, transparent vacuum lines coupled to a suitable vacuum source (not shown) provide satisfactory results. The extrusion of the liner is completed by employing a vacuum pressure in the range of about 20 to 760 torr. The valve on each line is closed as soon as the elastomer appears in the line; however, when the elastomer is present in all lines the vacuum service is removed and the valves are opened to restore atmospheric pressure so as to allow vacuum-loading stresses in the workpiece to decay. The liner 16, after completion of the curing step, has a contour identical to the base and the workpiece and holds the latter in a stress-free state during the machining operation. Satisfactory results have been achieved with liners having a thickness in the range of about 0.001 to 0.035 inch. Upon completion of the machining operation the liner and workpiece are readily removed from the base by contacting the liner at the polar region with a pressurized stream of fluid such as air or water delivered through passageway 24 in the base. For example, the seal between the liner and the base is readily broken by using a stream of water at a pressure of about 20 to 80 pounds. The elastomeric material is prevented from entering passageway 24 during the formulation of the liner by insertion of a suitable plug (not shown).

The elastomeric formulations which form the resilient liners require the following characteristics: a low viscosity in the range of about 200 to 400 poises at 25°C. for facilitating the extrusion thereof between the workpiece and the base; a curing temperature in the range of about 25° to 40°C. for inhibiting thermal damage to the workpiece; and minimal volume change during the curing cycle to prevent inadequate support of the workpiece or damage to the latter resulting from expansion or shrinkage of the liner. The elastomeric liner must possess the following properties: negligible creep or deflection of the liner when under forces resulting from the weight of the workpiece or machining operations for preventing distortion of the workpiece; sufficient adherence to the base and the workpiece to permit machining of the latter and yet readily separable from the workpiece and base without damage to the workpiece or the surface finish thereon; and compatibility with the workpiece and the cutting fluids and/or coolants.

Suitable castable elastomeric materials or formulations which meet the aforementioned criteria include polysulfide rubber, depolymerized natural rubber, silicone rubber, urethanes, styrenebutadienes, and butadiene-acrylonitriles. Castable depolymerized natural rubber formulations found satisfactory for forming the liner are sold under the trademarks "DPR 2137," "DPR 336," and "DPR 7419" with their respective accelerator and curing agent and are available from Hardman Inc., Belleville, New Jersey 07109. Silicone rubber formulations available from Dow Corning Corporation, Midland, Michigan 48641, and sold under the trademarks "Silastic A" and "Silastic B" with attendant catalysts "1" or "2" are also satisfactory for forming the liner. Further, polysulfide rubber formulations suitable for preparing the liner of the present invention may be obtainable as a four-component system sold under the trademark "Rubberjel," available from The L. D. Caulk Company, Milford, Delaware 19963. This four-component system consists of the rubber base or polysulfide (Part A), a catalyst (Part B), a plasticizer consisting of "Plasticizer 93" and/or "Plasticizer 94" (Part C), and an accelerator (Part D).

To further illustrate the fixture and method of the present invention an example relating to the preparation and use of the fixture is set forth below. In this example the elastomeric formulation employed for providing the liner is the aforementioned polysulfide rubber sold under the trademark "Rubberjel."

EXAMPLE

A 30-inch-diameter aluminum workpiece of a hemispherical configuration was machined on the internal surfaces thereof by coupling the workpiece to a lathe chuck with the fixture of the present invention. The workpiece was mounted in the fixture by blending together 3,000 grams of the polysulfide rubber formulation consisting of 45 weight per cent of the polysulfide rubber base, 45 weight per cent catalyst, 7.4 weight per cent of the plasticizer (Plasticizer 93), and 2.6 weight per cent of the accelerator. Approximately 2,900 grams of this blend was poured into the polar region of a hemispherically shaped cavity in the fixture base. The workpiece was placed in the cavity and lightly urged against the elastomeric formulation which forced or extruded the blend towards the top of the cavity. An O-ring of surgical rubber was placed about the upper edge of the workpiece and the valves in eight vacuum lines circumferentially spaced about and projecting through the upper end of the cavity in the base were opened to complete the extrusion at a pressure of approximately 500 torr. With the elastomeric formulation in place about virtually the entire outer surface of the workpiece and level at the O-ring or equator of workpiece the vacuum was terminated and the lines removed. The formulation was then allowed to vulcanize or cure for 2 hours at 25°C. The completed fixture with the workpiece held in place by the cured liner was mounted on the rotatable table or spindle of a lathe and the interior surface of the workpiece including the face and lip were machined to final dimensions. After completing the machining operation the liner and workpiece were removed from the base by breaking the seal between the liner and the base with a force provided by water at 20 pounds pressure and exerted against the polar region of the liner.

Three hemispherical workpieces similar in size to the workpiece in this example were machined in a conventional vacuum type pot chuck and were found to be 0.0162 to 0.0184 inch out-of-round at the equator. These workpieces were remachined using the fixture of the present invention and showed an out-of-roundness of 0.0004, 0.0005, and 0.0002 inch at the equator.

It will be seen that the present invention provides a significantly improved fixture for supporting workpieces or parts in a non-distorted state for machining operations. The elastomeric liner in the fixture is capable of supporting workpieces having an "as-cast" and rough-machined surface with relatively large dimensional variations in the surface contour. Also, as briefly mentioned above, the fixture of the present invention can be used to support a workpiece for external surface machining. In such an embodiment the base of the fixture has a portion thereof of a configuration similar to the internal configuration of the workpiece but of slightly smaller dimensions that projects into the workpiece with the elastomeric liner formed between the latter and the base portion as described above, except that the O-ring is disposed about the equator of the base portion rather than about the workpiece.

What is claimed is:

1. A fixture for supporting a workpiece having a configuration defined by an out-of-round surface of revolution for attachment to rotatable means of a metal working machine. comprising a base attached to said means with said base having a surface portion thereon of a configuration substantially corresponding to an external surface of said workpiece, said external surface of the workpiece being disposed in a nesting, contiguous relationship with said surface portion, an elastomeric liner of varying thicknesses in the range of about 0.001 to 0.035 inch disposed between and adherent with said surface portion and said external surface with said liner contacting the latter over virtually the entire area thereof oppositely disposed from the surface area of the workpiece against which work is to be applied by the metal working machine, said liner being characterized by maintaining the workpiece in a stress-free state during said work, and a passageway projecting through said base and in registry with said surface portion at a location adjacent the innermost end thereof for conducting a fluid against said liner for disrupting the coupling formed by said liner with said surface portion.

2. A fixture as claimed in claim 1, wherein the liner is selected from the group of castable elastomeric materials consisting of polysulfide rubber, depolymerized natural rubber, silicone rubber, urethanes, styrene-butadienes, and butadiene acrylonitriles, said materials are characterized by being cured at a temperature in the range of about 20° to 40°C., a viscosity in the range of about 200 to 400 poises at 25°C. prior to casting, and wherein said coupling with said surface portion is disruptable by contact with said fluid at a pressure in the range of 20 to 80 psi.

* * * * *